Feb. 26, 1935.  F. UHLMANN  1,992,515
APPARATUS FOR THE PREPARATION OF FOODSTUFFS
Filed Oct. 14, 1931  2 Sheets-Sheet 1
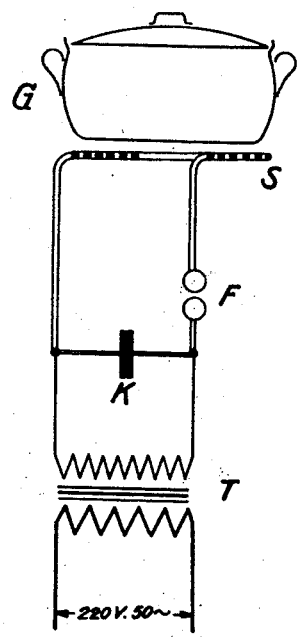
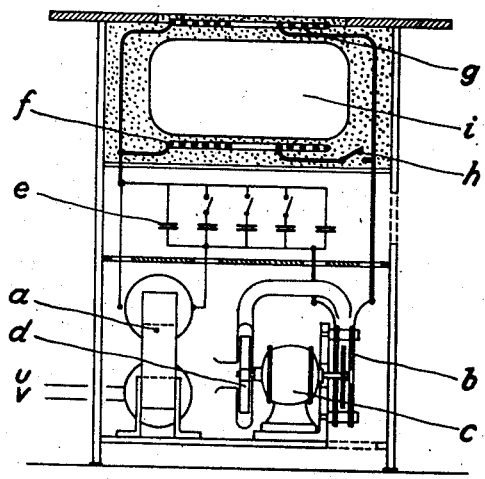
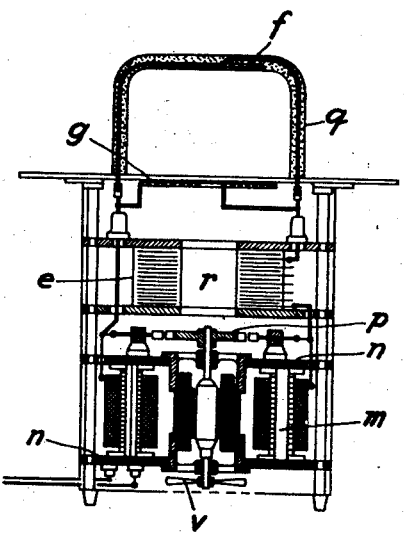
Inventor:
Fritz Uhlmann Feb. 26, 1935.   F. UHLMANN   1,992,515
APPARATUS FOR THE PREPARATION OF FOODSTUFFS
Filed Oct. 14, 1931   2 Sheets-Sheet 2

Patented Feb. 26, 1935

1,992,515

UNITED STATES PATENT OFFICE 1,992,515

APPARATUS FOR THE PREPARATION OF FOODSTUFF

Fritz Uhlmann, Berlin-Lichterfelde, Germany, assignor to Aktis Studiengesellschaft für Kohleforschung mit beschränkter Haftung, Berlin-Lichterfelde, Germany, a corporation of Germany Application October 14, 1931, Serial No. 568,856
In Germany December 29, 1928

8 Claims. (Cl. 219—47)

The present invention relates to a process and an apparatus for the preparation of food, such as vegetables, meat, fruit and the like, for the preparation of beverages such as coffee, tea, for the preservation of liquids such as milk, fruit juices and the like. The present application covers the apparatus, the process being officially held subject-matter for a divisional application. An explanation of the process will facilitate an understanding of the apparatus. The process is characterized by the fact that the substances which are to be treated are subjected to the effect of an electric high frequency field. The apparatus which is used is hereinafter described as the wave oven.

Fig. 1 is a diagrammatic representation of the general structural scheme;

Fig. 2 is an elevation partly in section of one form of oven;

Fig. 3 is a modified form of oven;

Figure 4:
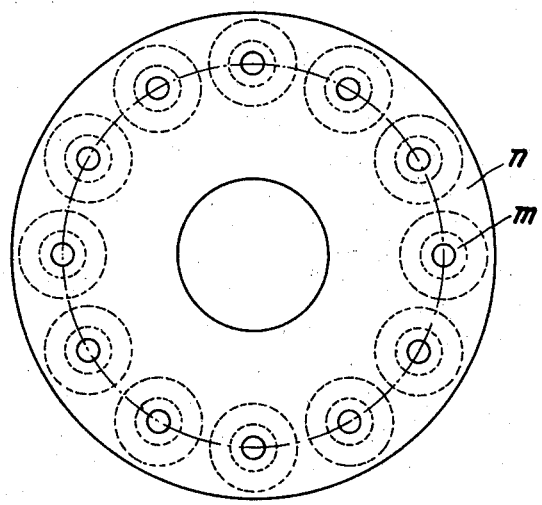
Fig. 4 is a plan view of Fig. 3.

The process may be briefly described, in the case of such a wave oven, with the aid of Figure 1 which is a diagrammatical drawing. The primary coil of the transformer T is supplied with an alternating current of about 220 volts and 50 periods per second; to its secondary coil is connected a condenser K, a spark gap F and a coil S, in such a way that the coil emits a high frequency field.

It has been found to be particularly advantageous to choose the dimensions in such a way that the field emits waves of a length of 800 m. or less. If for example cabbages, beans or carrots are to be cooked, then they are submitted to the effect of the field in the container G, if necessary with a little water in the usual way, while they are separated from the coil S by a plate which is not an electric conductor. The same applies to all other food stuffs.

It has been found that the time required for the preparation is reduced to a fraction of the time required by the use of any one of the hitherto known methods of preparation. It has also been found that the prepared food has in many cases a considerably different taste when compared with the same food prepared in the usual way.

This is especially so in the case of vegetables and is associated with the fact that the salts which are present in the raw vegetables are not destroyed by the new process. The same applies to the vitamins which are present in them. The utilization of the raw materials is therefore much more favourable in the case of the present process which is therefore very suitable in the preparation of food for sick persons. The undesirable generation of odours during the cooking of food is also eliminated, without it being necessary to close the pots tightly. In the preparation of beverages such as tea or coffee the maximum temperature of 70 to 75° C. is not exceeded and yet the same extraction from the raw material is obtained as with the higher temperatures of 100 or almost 100° C. heretofore employed. The process can also be applied to food-stuffs which are in closed containers, and they can be cooked ready for consumption or preserved while they are in the tins or the like. Fruit, for example apples, can be cooked in their skins and without losing their shape. It has been proved that any fungi or the like which may be on the surface are destroyed on the spot. Liquids such as milk are also freed from noxious living organisms when treated by this process, without there being any need to bring the temperature to 100° C.

It has been found advantageous to frit the field coil from metal powder or mixtures of metal powders, in an electric high frequency field, in a manner already known and described in detail in the German Patent 405,880. The following metals are particularly suited for the purpose: silver (Ag), lead (Pb), cobalt (Co), nickel (Ni), iron (Fe), manganese (Mn), copper (Cu), bismuth (Bi), tantalum (Ta), wolfram (W), uranium (U), and molybdenum (Mo). If a so-called extinguished spark gap be used then a current of air is blown through between the plates by means of a small fan in order to cool the plates and make it possible to work continuously.

The wave oven is so constructed that in its lower part the transformer, the condenser and the spark gap are arranged, while the working coil is situated immediately under the hot plate. A further coil which if desired, can be switched in parallel to the first coil may be placed a little lower so that a box-like space will be established between the two, this space being used when the objects to be cooked are to be exposed to the effect of the field on all sides.

Figure 2 shows such a wave oven. $a$ is the transformer which is supplied with current through the leads $u$ $v$. The motor $c$ on the one hand drives the rotating parts of a spark gap $b$ and on the other hand drives the fan $d$ by which cool air for the spark gap is provided. $e$ is the condenser which can be so arranged that various quantities can be switched on. When the switch $h$ is closed the two coils $f$ and $g$ are working, otherwise only the coil $g$. The sparking gap in the rotation spark gap $b$ consist preferably of pieces of fritted metal, for example, fritted alloys of Wo and Mo.

A modification in the form of construction of the wave oven shown in Figure 2 might be made for in the place of the rotating spark gap an ordinary plate spark gap could be substituted and the air current generated by the fan passed therebetween.

Figure 5:
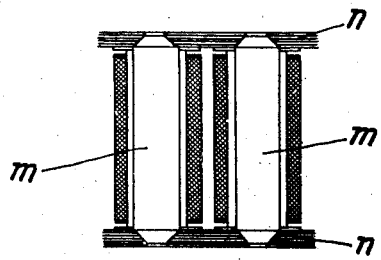
Fig. 5 is a cross-section through two legs of the transformer in Fig. 3.

Figure 3 shows another form of construction of the interior of the wave oven while Figure 4 is a plan view of the cover plate of the transformer used in this case and Figure 5 is a cross-section through two adjacent shanks of the transformer and a part of both transformer discs which lies between them.

It is presumed that a rotatory spark gap is to be used, the motor for which also drives a fan for cooling the spark gap, the transformer and the condenser. These parts are arranged symmetrically about the meter shaft which is in a vertical position. The iron skeleton of the transformer is of the usual shape. Its shanks $m$ are arranged in a circle between two ring discs $n$. The shanks and the discs consist of staples of thin soft iron sheets with the usual intermediate layers of paper. The shanks which have a circular section are tapered at the ends and are fitted into corresponding grooves of the discs. The shanks and the discs are held together by bolts and nuts and screws. Care must be taken, that the metallic contact between the discs and the shanks is not interrupted by paper fibres.

The motor is vertically arranged in the space between the shanks. To its shaft a fan $v$ is fixed at the lower end and to the upper end are secured the discs $p$ of the rotatory interrupter. The places at which sparking occurs are provided with fritted metal pieces, preferably of molybdenum or wolfram or of fritted alloys of these or other metals. The discs of the condenser $e$ which is arranged above the interrupter are provided with a hole in the centre so that a channel $r$ is formed through which the air flows which is sucked in by the fan $v$. Above the condenser is the working coil $g$. A second working coil $f$ the leads of which can be plugged into suitable sockets and which is parallel to the first working coil, can be so connected with a dome $q$, that a space is created which is both at the top and at the bottom under the influence of the field, whilst above the second coil $f$ a further field is available.

What I claim is:—

1. Apparatus for the preparation of food-stuffs comprising a casing having an oven, a transformer, a spark gap, a condenser, said transformer spark gap and condenser being arranged in the casing, and an induction coil associated with the oven.

2. Apparatus for the preparation of food stuffs in which the raw materials are subjected to the effect of an electric high frequency induced field comprising a transformer, a spark gap, a condenser, and induction coils of fritted metal powder.

3. Apparatus for the preparation of food stuffs in which the raw materials are subjected to the effect of an electric high frequency induced field comprising a transformer, a spark gap, and a condenser, the sparking places of said spark gap consisting of a fritted alloy.

4. Apparatus for the preparation of food stuffs in which the raw materials are subjected to the effect of an electric high frequency induced field comprising a transformer, a spark gap, a condenser, a main induction coil, a second induction coil, and means for connecting the coils in parallel whereby an available working space is constituted between the two said coils.

5. Apparatus for the preparation of food stuffs in which the raw materials are subjected to the effect of an electric high frequency induced field comprising a transformer, a spark gap, a condenser, and an air propeller for cooling said spark gap.

6. Apparatus for the preparation of food stuffs in which the raw materials are subjected to the effect of an electric high frequency induced field comprising a transformer, a motor actuated spark gap, and a condenser arranged symmetrically about a vertical shaft of the motor which actuates the spark gap.

7. Apparatus for the preparation of food stuffs in which the raw materials are subjected to the effect of an electric high frequency induced field comprising a transformer, a spark gap and a condenser said transformer consisting of upper and lower plates and shanks circularly disposed between the plates and having tapered ends entering bores in the plates.

8. Apparatus for the preparation of food stuffs in which the raw materials are subjected to the effect of an electric high frequency induced field comprising a transformer, a spark gap, an air propeller, and a condenser, the plates of said condenser being provided with central holes that form a conduit through which the air is drawn by the propeller.

FRITZ UHLMANN.